Sept. 6, 1960   J. C. McBROOM   2,951,504
OVERRUN CONTROL VALVE FOR ICE CREAM DISPENSERS
Filed Sept. 3, 1957   2 Sheets-Sheet 1
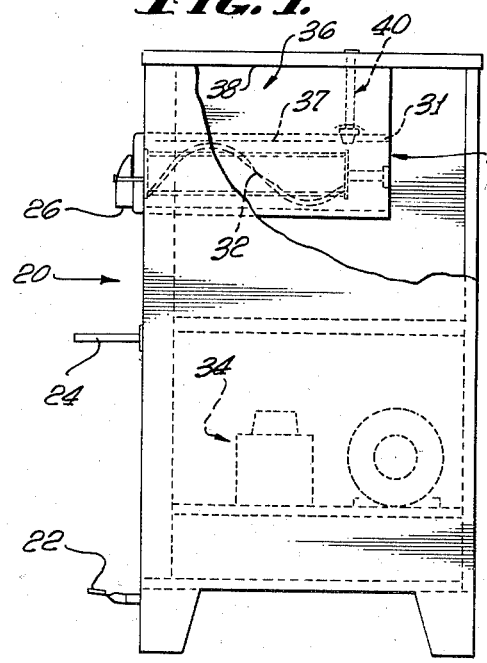
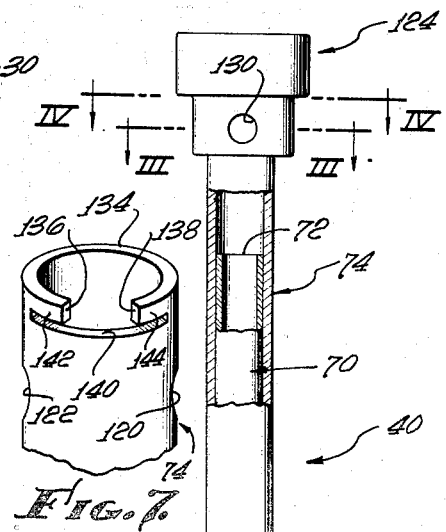
INVENTOR.
JAMES C. McBROOM
BY
ATTORNEYS.

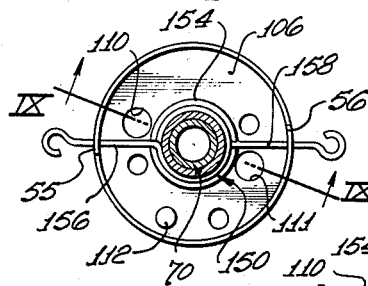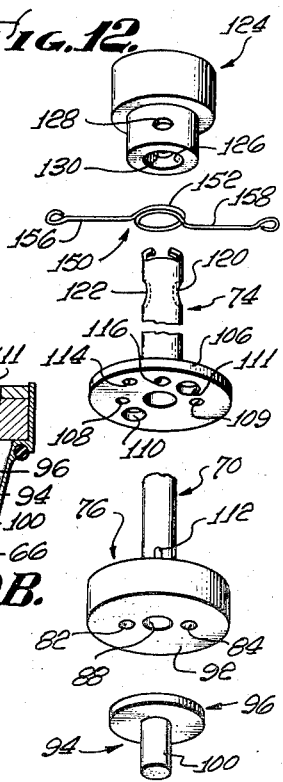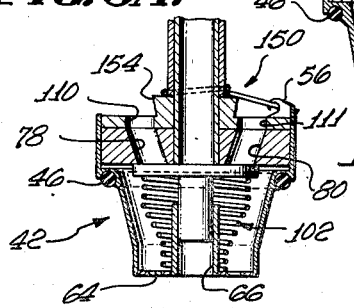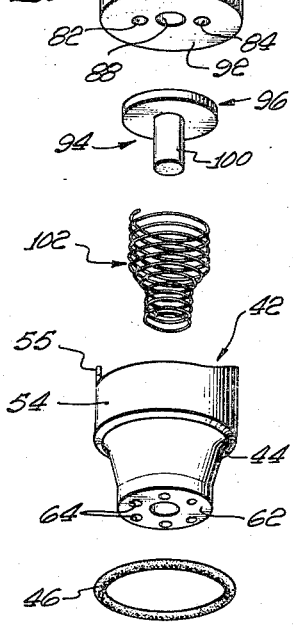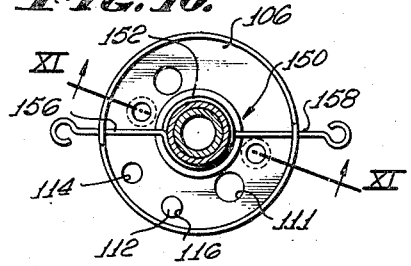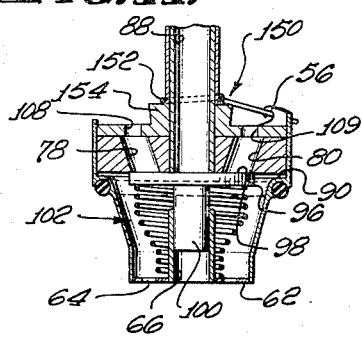

United States Patent Office 2,951,504
Patented Sept. 6, 1960

2,951,504

OVERRUN CONTROL VALVE FOR ICE CREAM DISPENSERS

James Cullin McBroom, Sherman Oaks, Calif., assignor, by mesne assignments, to Florence Patty, Bellflower, Calif.

Filed Sept. 3, 1957, Ser. No. 681,803

5 Claims. (Cl. 137—606)

The present invention relates generally to a valve for controllably mixing a gas such as air with a liquid and particularly describes such a device for selectively controlling the ratio or proportion between air and a liquid mix and controlling the flow of the mixed air and liquid from a reservoir into a freezing and dispensing chamber.

In machines for dispensing frozen or semi-frozen milk products such as confections, there is conventionally provided a mixing chamber having a dasher or similar device for stirring the mixture therein at a temperature of around 25°–30° F. A freezing jacket may partially or wholly surround the mixing chamber and means are provided in accordance with well-known practice for supplying a refrigerant as Freon or the like to evaporate in the jacket to produce the desired temperature within the chamber. There is also provided in a device of this character a tank or reservoir containing a quantity of mix or concentrated liquid preparation of desired proportions of milk, cream, flavoring and similar materials. Means are also provided for permitting a quantity of the mix to enter the mixing chamber from the reservoir, together with a predetermined proportion of air so that, within the mixing chamber, the dasher may stir and whip up the liquid mix and air into a mixture in order to provide a finished product of desired consistency.

Valves heretofore used between the reservoir and mixing chamber have been unsatisfactory in certain respects, particularly in that they failed to properly control "overrun" or the admission of the predetermined desired proportion of air in the total quantity of liquid and air admitted to the mixing chamber. An additional problem arises from the design and construction of such a valve, since sanitary regulations conventionally require that the valve, as well as other components of the complete machine, be disassembled and thoroughly cleaned periodically, generally once per day. It is thus important that the overrun control valve includes a minimum number of parts, particularly small parts which are easily lost by the operator during disassembly, cleaning and assembly; and that the surfaces of the valve components be so arranged as to minimize the possibility that milk or milk products might leave a slight residue on such surfaces which could deteriorate and thus endanger the sanitary standards required.

The device of the present invention meets the above need and in its preferred form hereinafter described and illustrated includes a housing providing means for slidably receiving and guiding a portion of a valve closure member; a valve seat having a number of openings formed therethrough, at least one such opening communicating with the liquid preparation in the reservoir and at least one other such opening communicating with atmosphere; resilient means for lightly biasing the valve closure member upwardly into sealing relation with the valve seat; and means for selectively controlling the proportion of air admitted to the air opening of the valve seat relative to the amount of liquid permitted to flow through the liquid openings of the valve seat. The device affords an easily manipulable adjustment by which the operator can make a fine adjustment of the amount of air admitted into the air opening, so that the desired proportion of air to liquid may be easily and quickly adjusted. Moreover, the construction and operation of the valve prevent the backward flow of liquid out of the mixing chamber into the reservoir, so that the possibility of contamination of the liquid mix in the reservoir by the material in the mixing chamber is virtually completely eliminated.

Accordingly, it is an object of the present invention to provide a control valve of novel structure for admission of liquid and air mixture into the freezing compartment of a freezer; to disclose a valve of the above character having a minimum of component parts for its purposes; to disclose such a device whose component parts are not easily lost or misplaced during assembly and disassembly as for cleaning or other maintenance operations; to disclose a device of the above character including selectively operable means for varying the proportion of air to liquid mix passed by the valve; and for other and allied purposes which will be understood as the following description of a preferred embodiment of the invention progresses. The description is to read in conjunction with the accompanying drawings in which:

Fig. 1 is a side elevational view with a portion of the wall broken away of a typical freezer-dispenser in connection with which the present invention may be advantageously used.

Fig. 2 is a side elevational view of a preferred form of the device of the present invention with portions broken away, together with fragmentarily shown portions of adjacent structure in a freezer-dispenser.

Figs. 3 and 4 are sectional views taken respectively on lines III—III and IV—IV of Fig. 2, with the parts shown in position for admitting the maximum proportion of air through the upper metering mechanism.

Figs. 5 and 6 are sectional views corresponding to Figs. 3 and 4 respectively except that the parts are shown in their position for metering a smaller proportion of air through the metering mechanism.

Fig. 7 is a fragmentary perspective view of the upper end of the outer sleeve of the present mechanism with the cap removed, showing the arcuate arms for positively limiting rotational movement of the cap on the sleeve and for frictionally retaining the cap in the position selected between the established limits.

Fig. 8 is a sectional view taken on line VIII—VIII of Fig. 2, with the metering flange positioned for maximum flow of liquid mix therethrough.

Fig. 9A is a sectional view taken on line IX—IX of Fig. 8, showing the valve in closed position.

Fig. 9B is a view similar to Fig. 9A except that the valve is shown in partially open position.

Fig. 10 is a view similar to Fig. 8 except that the metering flange is positioned for less than maximum flow of liquid mix therethrough.

Fig. 11 is a sectional view taken on line XI—XI of Fig. 10, the valve being shown in closed position.

Fig. 12 is an exploded view, with some parts shown fragmentarily, of the device shown in assembled form in Fig. 2.

Referring now in detail to the drawings there is indicated generally at 20 in Fig. 1, a dispenser-freezer adapted to selectively dispense a desired quantity of a frozen product such as milk shakes, soft ice cream, frozen custard, or the like. The dispenser 20 includes an actuating member such as pedal 22 and a shelf or the like 24 may be provided to support a cup or similar container for receiving the frozen product from an outlet 26. Within the dispenser 20, in the upper portion thereof, there is disposed a horizontally oriented mixing and freezing chamber indicated generally at 30 within which is rotatably mounted a dasher 32 adapted to be rotated by driving means (not shown) when the pedal 22 is depressed by the operator to obtain a serving of the product. Chamber 30 is partially or wholly surrounded by a freezing jacket 31 of conventional construction connected by suitable conduit means (not shown) to a motor driven compressor indicated generally at 34.

Immediately above the freezing chamber 30 is a reservoir tank indicated generally at 36 and containing a quantity of the liquid mix which is admitted from time to time into the freezing chamber 30, together with a quantity of air, to be beaten into the frozen product in the chamber 30. The valve of the present invention is indicated generally at 40 and serves to control the proportion of air and liquid mix admitted into the freezing chamber 30. The lower portion of the valve rests upon and is supported by the lower wall 37 of the reservoir 36, and the uppermost end of the valve 40 projects somewhat beyond the upper edge 38 of the wall of the reservoir 36, so that the upper end of the valve is open to atmosphere.

The valve 40 is seen in greater detail in Fig. 2 and in the exploded view of Fig. 12. A housing collar, indicated generally at 42, includes a downwardly directed, shallow, annular channel 44 (see Fig. 12) for receiving an O-ring 46 which is seated upon a flange 48 formed at the upper end of a tube 50 which is fixed at its upper end to wall 37 and at its lower end to the upper wall 35 of the freezing compartment 30. Flange 48 underlies and is connected to the bottom wall 37 at opening 52 formed in the reservoir 36. Collar 42 includes an upwardly extending, cylindrical side wall 54 provided at its upper end with a pair of diametrically opposed hook configurations 55 and 56. The collar 42, in its lower portion, includes a generally cylindrical shell 58 having slightly inwardly tapered walls 60 and terminating downwardly in a flat bottom 62 provided with a plurality of spaced openings therethrough at 64. Projecting upwardly from the bottom 62 is a centrally disposed guide sleeve 66 (see Fig. 11).

The major portion of the length of valve structure 40 includes a pair of tubular members, one slidably received within the other. As best appears in Fig. 2, the inner tubular member, indicated generally at 70, terminates upwardly at 72, and by preference extends throughout the major portion of the length of the outer tubular member indicated generally at 74. Tube 70 (see Fig. 12) terminates downwardly in an enlarged cylindrical base indicated generally at 76 having formed therethrough one or more bores 78 and 80 (see Fig. 11) terminating downwardly in openings 82 and 84 respectively. Centrally of the base 76 there is a vertical bore 86 constituting a continuation of the bore through the tube 70 and terminating downwardly in an opening 88 centrally of the bottom of base 76. The base 76 is received within a cylindrical sleeve 54 of collar 42 and rests upon an internal annular shoulder 90 within the collar. The lower face 92 of the base 76 is flat.

Means are provided for sealingly contacting the lower face 92 of the base 76 and thereby blocking fluid passage through the openings 82, 84 and 88. In the present form of the invention such means include a valve closure member indicated generally at 94 (Fig. 12) including an enlarged cylindrical upper portion 96 having a flat, upper face 98. The closure 94 includes also a downwardly extending guide stem 100 slidably receivable in the guide sleeve 96 of the collar 42 and by preference the stem and sleeve are cylindrical in section. Resilient means such as the spring indicated generally at 102 is provided for biasing the valve closure member 94 into its upper or sealing position seen in Fig. 9A and Fig. 11, the spring 102 resting at its lower end upon the bottom 62 of the collar.

The outer tube 74 of the present structure terminates downwardly in an enlarged metering flange 106 adapted to overlie the enlarged base 76 of the inner tube 70. Flange 106 is provided with a plurality of bores extending therethrough of different sizes. In the present illustration there are two pairs of such bores, one pair including bores 108 and 109, and the other pair including bores 110 and 111. Each of these pairs of bores is adapted to register with, selectively, the upper ends of the bores 78 and 80 of the enlarged base 76 previously described. Means are provided for assuring the accuracy of such registration and in the present illustration such means include an upstanding, registering prong 112 projecting upwardly from the upper face of the base 76 and adapted to be received in a selected one of the openings 114 and 116 formed in the metering flange 106. In Figs. 10 and 11 the registering prong 112 is received in opening 116, thereby positioning the metering flange 106 relative to the base 76 so that the smaller openings 108 and 109 register with the bores 78 and 80 respectively. In Figs. 8, 9A and 9B, the registering prong 112 is received in the opening 114, thereby positioning the metering flange 106 such that the larger openings 110 and 111 are in registration with the bores 78 and 80 respectively.

It will be seen that the positioning of metering flange 106 in either of the positions just mentioned serves to effectively throttle or proportion the amount of liquid mix which is admitted downwardly through the openings of the metering flange 106 and through the inclined bores 78 and 80 of the base 76. The metering thus achieved is supplemented by additional metering means for controlling the admission of air into the upper end of the bore 86 of tube 70. In the present illustration such means include one or more openings 120, 122, formed in the side wall of the tube 74 spaced slightly below the top of that tube. A cap indicated generally at 124 is provided with a downwardly open bore 126 (see Fig. 12) adapted to slidably receive the upper end of the tube 74. Openings are formed through the side wall of the lower portion of cap 124 defining bore 126; in the present instance there are two of such openings 128 and 130 spaced arcuately to correspond with the spacing of openings 120 and 122 formed in the upper portion of the tube 74. As will readily appear from a comparison of Figs. 3 and 5, the cap 124 may be rotated on the tube 74 so that, as particularly appears in Fig. 3, maximum cross-sectional area is permitted through the aligned openings 120 and 130, while the position of the parts as seen in Fig. 5 provides a somewhat restricted cross-sectional area for the ingress of air through the openings formed in the side wall of cap 124 and the openings of side wall of tube 74 into the interior of the tube and thence downwardly through the tube 70.

Desirably there are provided means for restricting the rotational movement of cap 124 on the upper end of tube 74 between certain predetermined limits. Similarly, it is desirable that means be included for frictionally or otherwise yieldably retaining the cap 124 in whatever position relative to tube 74 it may be placed by the operator. In the present illustration these means are embodied in the structure seen in Figs. 4, 6 and 7. As best appears in Fig. 7, the upper annular edge 134 of tube 74 is discontinuous over an arcuate portion defined by abutments 136 and 138. Desirably a cut 140 is made transverse to the axis of tube 74 and extends substantially beyond the arcuate interruption between the abutments 136 and 138. Thus a pair of arcuate arms 142 and 144 are formed, and these may be deformed slightly outwardly in order to frictionally grip the inner side wall of bore 126 in the cap 124. The cap itself is provided with an inwardly projecting finger or stop member 146 adapted to abut against either of the two means 136 and 138 and thereby determine the limits of arcuate travel of the cap relative to the tube.

The tubes 70 and 74 are held in assembled relation with housing collar 42 as seen in Fig. 2 by suitable means such as the resilient member indicated generally at 150. This member may be made of resilient spring wire and includes a generally circular, central portion 152 adapted to rest upon an upwardly facing shoulder 154 immediately above and preferably formed integrally with the metering flange 106. The attachment member 150 includes also a pair of outwardly extending arms 156 and 158 which may be depressed downwardly as seen in Fig. 2 in order to be engaged by the opposed hooks 55 and 56 formed in the upper edge of the side wall 54 of the housing collar. Desirably the attachment member consists of a single continuous length of spring wire or the like as shown.

During the operation of the freezer dispenser of the present invention, the dasher 32 is rotated within the freezing chamber 30 by motor means activated by the operator through depression of the pedal 22. Rotation of the dasher within the freezing chamber serves to thoroughly mix the air and liquid therein and the resulting mixture is cooled to a temperature somewhat below freezing by the circulation of a refrigerant in the freezing jacket 31. Rotation of the dasher in this way tends to urge the frozen mixture within the chamber leftwardly, as seen in Fig. 1, and out the dispensing spout 26. As a result, the pressure within the freezing chamber 30, particularly in the right portion thereof, as seen in Fig. 1, tends to be slightly decreased. This permits the static head of liquid pressure from the liquid mix in the reservoir 36 to cause the valve closure member 96 to move downwardly against the relatively slight force of resilient spring 102 tending to bias the closure member upwardly against the lower face of the base 76. Thus, with the closure member 96 in slightly lowered position (see Fig. 9B) the liquid openings 82 and 84, as well as the air opening 88, are unblocked so that liquid and air can pass downwardly through such openings into the lower body portion 58 of the housing 42 and thence downwardly and outwardly through the openings 64 formed in the bottom 62 of the housing. In this way the supply of liquid mix and air within the freezing chamber 30 is replenished, making up for the quantity of the frozen mixture dispensed from the freezing chamber 30 through the spout 26.

Comparison of Figs. 9A and 11 will show the arrangement of the metering flange 106 for permitting maximum flow of liquid mix (as in Fig. 9A) or, by reason of the restricted size of the openings 108 and 109 in the flange, a smaller amount of liquid mix (see Fig. 11). Thus the operator, in assembling the present valve, may position the metering flange 106 in any of its rotational positions relative to the bores 78 and 80 in the base 76 and the parts will be retained in such position by the engagement of prong 112 with the proper one of the openings 114, 116 of the metering flange. Selection of the proper position will depend upon the judgment of the operator, based upon the viscosity of the liquid in reservoir 36, the height of such liquid in the reservoir, the desired consistency of the finished product and other factors. The proper selection of size of openings in the metering flange 106 is intended to be made initially in the assembly of the present device by the operator and is normally not changed during the day's operation.

In order to provide relatively fine adjustability and the proportion of air and liquid mix admitted into the freezing chamber 30, the operator may mechanically rotate the cap 124, rotatably mounted on the upper end of tube 74 to a desired position. Comparison of Figs. 3 and 5 indicates how the relative position of the openings 128 and 130 with respect to the openings 120 and 122 of the tube determines the degree of restriction upon inward air flow through the openings and thus influences the proportion of air and liquid mix admitted into the freezing chamber.

As soon as the chamber 30 has received through the valve a sufficient amount of air and liquid mix so that the pressure within the freezing chamber is brought back up to its previous value, the spring 102 returns the valve closure member 96 into sealing position, as seen in Figs. 9A and 11, and the freezing chamber is thus effectively isolated from the reservoir 36. Opening of the valve and admission of air and liquid mix into the chamber will occur whenever the frozen product is dispensed or extruded from the chamber during operation.

The entire valve assembly may be readily removed from its position as seen in Fig. 2 by merely lifting it upwardly relative to the wall 37 of the reservoir. Thus, for daily maintenance and cleaning of the valve, the operator removes the assembly, disengages the resilient retainer 150 from attachment to the hook configurations 55 and 56 of the housing collar, and disassembles the components and cleans them as by soaking in an appropriate cleaning or disinfectant solution or otherwise. It is to be particularly noted that no tools are needed for disassembly or assembly, and the eight component parts of the structure in the illustrative form herein shown include no tiny and easily misplaced items such as screws or the like.

In assembling the valve components, the base 76 and flange 106 are housed within the collar 42, and the resilient fastener 150 serves to force the flange and base downwardly relative to the collar so that an outer annular portion of the flat lower surface 92 of base 76 is pressed into sealing contact with the internal upwardly directed annular shoulder 90 formed in the collar. Thus no liquid mix from the reservoir can pass downwardly into the mixing chamber except, as controlled by valve closure 94, through passageways 78 and 80.

It will be understood that the metering cap 124 serves to adjustably control the effective cross-sectional area of the air passage for air flowing downwardly through tube 70. Thus the cap could be assembled directly upon the upper end of the inner tube 70 if desired, with such upper end projecting upwardly beyond the upper end of tube 74 and configured as is the upper end of outer tube 74 as hereinabove described and illustrated.

Accordingly, it will be seen that there is here provided a valve meeting the requirements for use in a mixing and freezing dispenser wherein admission of a liquid mix and air in substantially predetermined proportions is to be controlled. It will be understood that modifications and changes from the specific details of construction hereinabove described and illustrated may be made without departing from the invention as contemplated, and such modifications and changes are intended to be embraced within the scope of the appended claims.

I claim:

1. A valve for admitting into a freezing chamber a quantity of liquid mix from a reservoir and a generally proportionate quantity of air comprising: a housing collar having an outer downwardly facing annular shoulder adapted to sealingly contact the edge of a circular opening of a chamber upper wall and an upwardly projecting guide sleeve concentric with said shoulder; a vertically oriented inner tube having an enlarged lower base provided with a flat downwardly directed surface received in the upper portion of said collar and supported thereby, the base having a plurality of fluid passageways extending therethrough, one passageway communicating with the interior of the tube and another passageway being spaced laterally from the first and terminating upwardly in an upwardly directed port; an outer tube around said inner tube in telescoping relation and provided with an enlarged lower annular flange overlying said base and juxtaposed therewith and having a plurality of openings therethrough of different areas, a selected opening being registrable with said port; means for detachably retaining said flange, base and collar in assembled relation; a valve closure having a flat upper face adapted to sealingly contact the flat surface of said base and block the lower ends of said passageways, the closure including a downwardly projecting rod slidably receivable in said guide sleeve; and means for biasing said closure upwardly with its upper face in sealing contact with said surface.

2. The invention as stated in claim 1 including means carried at the upper end of one of said tubes for controllably throttling air flow into the tubes.

3. The invention as stated in claim 1 wherein one of said tubes is provided near its upper end with an aperture formed in its side wall and including means adjustably positionable relative to said aperture for controlling the effective size thereof and thus controlling air flow therethrough.

4. In a valve for admitting liquid from a liquid reservoir downwardly into a mixing chamber and simultaneously admitting air into the chamber, in combination: a housing collar having an internal upwardly directed annular shoulder and a hollow guide sleeve; an elongated tube including a lower enlarged base having a downwardly directed flat surface supported upon said shoulder and provided with a first passageway communicating with the hollow interior of said tube and terminating downwardly in a port in said surface and provided with a second passageway extending through the base and spaced laterally from the first passageway; a second tube in telescopic relation with the first named tube, the upper end of one of the tubes being formed to provide a pair of arcuately spaced abutment shoulders and a port formed in the tube side wall below said shoulders and including a cap having a closed top, a cylindrical recess and an apertured side wall, the recess being adapted to slidably and rotatably engage the tube upper end and the cap having an inwardly directed projection in the recess abuttable against said abutment shoulders to limit rotation of the cap on the tube; a valve closure member having a downwardly projecting stem slidably received in said sleeve and an upper flat surface underlying the lower ends of said passageways; resilient means biasing the closure member upwardly; and adjustable means for selectively controlling, when the closure member is moved downwardly into open position, the proportion of liquid flowing through the second passageway to air flowing through the tube and first passageway.

5. In a valve for admitting liquid from a liquid reservoir downwardly into a mixing chamber and simultaneously admitting air into the chamber, in combination: a housing collar having a hollow guide sleeve; an elongated tube including a lower enlarged base having a surface supported upon said collar and provided with a first passageway communicating with the hollow interior of said tube and terminating downwardly in a port in said surface and provided with a second passageway extending through the base and spaced laterally from the first passageway; a valve closure member having a downwardly projecting stem slidably received in said sleeve and an upper surface underlying the lower ends of said passageways; resilient means biasing the closure member upwardly; and adjustable means for selectively controlling, when the closure member is moved downwardly into open position, the proportion of liquid flowing through the second passageway to air flowing through the tube and first passageway.

References Cited in the file of this patent

UNITED STATES PATENTS

| 481,564 | Huggins | Aug. 30, 1892 |
| 492,792 | Claassen | Mar. 7, 1893 |
| 819,392 | Wayman | May 1, 1906 |
| 2,145,446 | Joanson | Jan. 31, 1939 |
| 2,629,448 | Duggan | Feb. 24, 1953 |